(12) United States Patent
Khare et al.

(10) Patent No.: US 6,622,215 B2
(45) Date of Patent: Sep. 16, 2003

(54) MECHANISM FOR HANDLING CONFLICTS IN A MULTI-NODE COMPUTER ARCHITECTURE

(75) Inventors: Manoj Khare, Saratoga, CA (US); Akhilesh Kumar, Sunnyvale, CA (US); Lily P. Looi, Portland, OR (US); Sin S. Tan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 09/753,263

(22) Filed: Dec. 29, 2000

(65) Prior Publication Data

US 2002/0129206 A1 Sep. 12, 2002

(51) Int. Cl.[7] ................................................. G06F 12/00
(52) U.S. Cl. ........................ 711/141; 711/141; 711/146; 711/124
(58) Field of Search ................................. 711/124, 141, 711/146

(56) References Cited

U.S. PATENT DOCUMENTS

| | | | |
|---|---|---|---|
| 4,399,506 A | * | 8/1983 | Evans et al. |
| 5,664,151 A | * | 9/1997 | Galles et al. |
| 6,405,289 B1 | * | 6/2002 | Arimilli et al. |

* cited by examiner

Primary Examiner—Jack A. Lane
(74) Attorney, Agent, or Firm—Blakely, Sokoloff, Taylor & Zafman LLP

(57) ABSTRACT

According to one embodiment, a method is disclosed. The method includes receiving a first request from a first node in a multi-node computer system to invalidate a first cache line at a second node. The method also includes receiving a second request from the second node to invalidate the first cache line at the first node and detecting the concurrent requests at conflict detection circuitry.

15 Claims, 4 Drawing Sheets

MECHANISM FOR HANDLING CONFLICTS IN A MULTI-NODE COMPUTER ARCHITECTURE

FIELD OF THE INVENTION

The present invention relates to computer systems; more particularly, the present invention relates to resolving cache coherence conflicts in a computer system.

BACKGROUND

In the area of distributed computing when multiple processing nodes access each other's memory, the necessity for memory coherency is evident. Various methods have evolved to address the difficulties associated with shared memory environments. One such method involves a distributed architecture in which each node on the distributed architecture incorporates a resident coherence manager. Because of the complexity involved in providing support for various protocol implementations of corresponding architectures, existing shared memory multiprocessing architectures fail to support the full range of MESI protocol possibilities. Instead, existing shared memory multiprocessor architectures rely on assumptions so as to provide a workable although incomplete system to address these various architectures.

One of the fundamental flaws of these existing memory sharing architectures is that a responding node, containing modified data for a cache line where the home storage location for the memory in question resides on a different node, is expected only to provide a passive response to a request. No mechanism is built into the architectures to provide intelligent handling of the potential conflict between, for example, back-to-back Invalidation requests to the same line of memory. Therefore, a distributed mechanism for resolving cache coherence conflicts in a multiple processing node architecture is desired.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method and apparatus for resolving cache coherence conflicts in a multi-node computer architecture is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
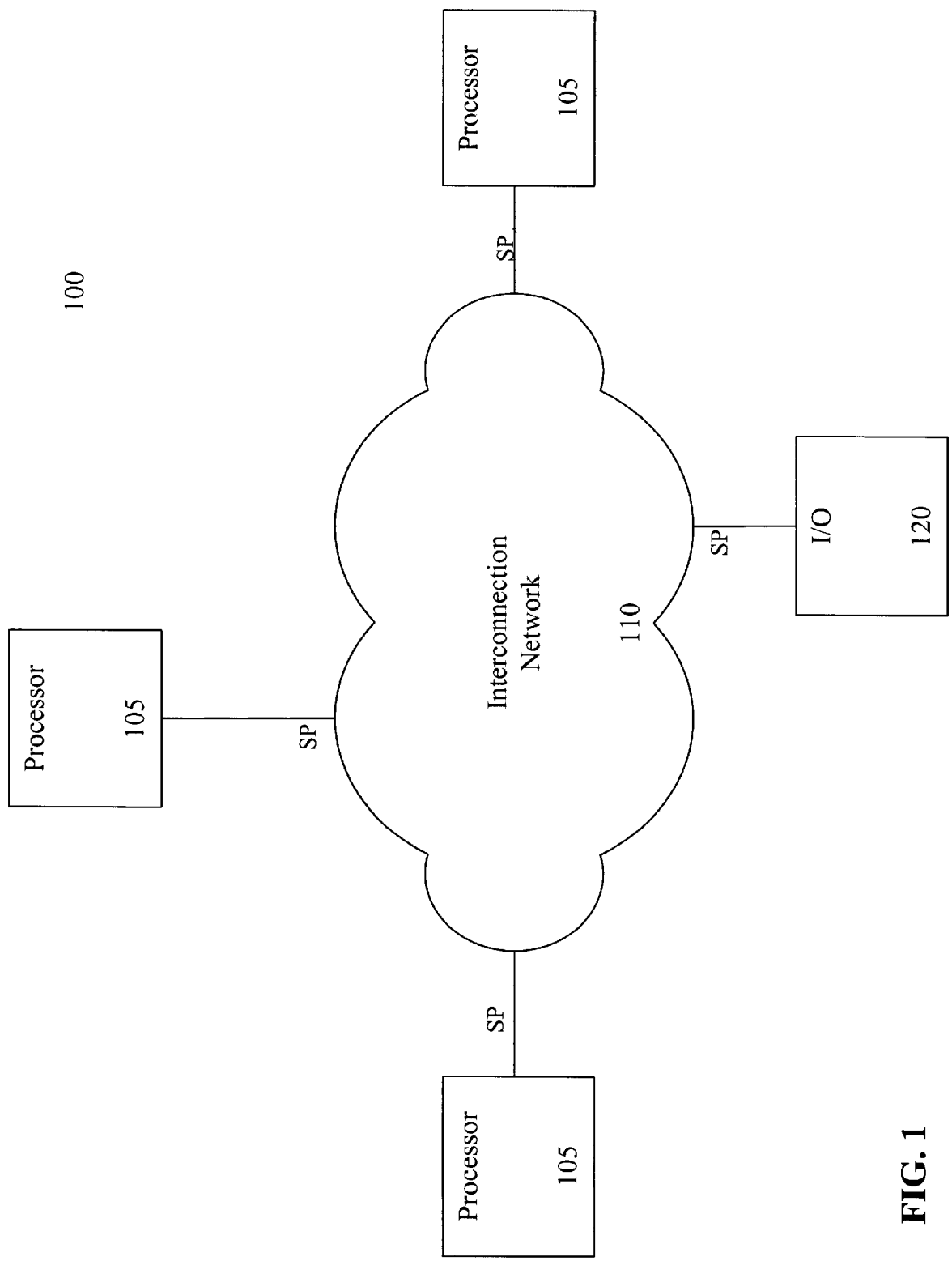
FIG. 1 illustrates one embodiment of a computer system.

FIG. 1 illustrates one embodiment of a computer system 100. Computer system 100 includes an interconnection network 110. According to one embodiment, network 110 includes switches coupled to a multitude of network nodes. The network nodes in computer system 100 include processor nodes 105 and one or more input/output (I/O) nodes 120 coupled via network 110. According to a further embodiment, each processor node 105 and I/O node 120 are coupled to network 110 via a scalability port.

According to one embodiment, a scalability port (SP) is an inter-node interface used to enable the implementation of a shared memory architecture, multi-processor system. The scalability port is a point-to-point cache coherent interface for interconnection of processor nodes 105 with local memory, I/O nodes 120 and network switches. Cache coherence is a mechanism to provide a consistent view of memory in a shared memory system with multiple caching agents that could have copies of data in private caches. Any updates to the memory is done in a manner that is visible to all of the caching agents. Although computer system 100 has been shown with three processor nodes and one I/O node, one of ordinary skill in the art will recognize that computer system 100 may be implemented with other quantities of processor and I/O nodes.

According to one embodiment, the functionality of the SP is portioned into three layers. Each layer performs a well-defined set of protocol functions. The layering results in a modular architecture that is easier to specify, implement and validate. The layers from bottom to top are the physical layer, the link layer and the protocol layer. The physical layer is a point-to-point interface between any two SP agents. The physical layer is responsible for electrical transfer of information on a physical medium. The electrical transfer is achieved by not requiring the physical layer to support any protocol level functionality.

The link layer abstracts the physical layer from the protocol layer, thus, guaranteeing reliable data transfer between agents on a SP. In addition, the link layer is responsible for flow control between the two agents on a SP and provides virtual channel services to the protocol layer. Virtual channels allow sharing of the physical channel by different protocol level messages for cache coherence.

The protocol layer implements the platform dependent protocol engines for higher level communication protocol between nodes such as cache coherence. According to one embodiment, the protocol layer uses packet based protocol for communication. The protocol layer formats a packet (e.g., request, response, etc.) that needs to be communicated and passes it to the appropriate virtual channel in the link layer. The protocol layer is bypassed in pure routing agents resulting in low latency transfer from sender to the receiver through the network.

Figure 2:
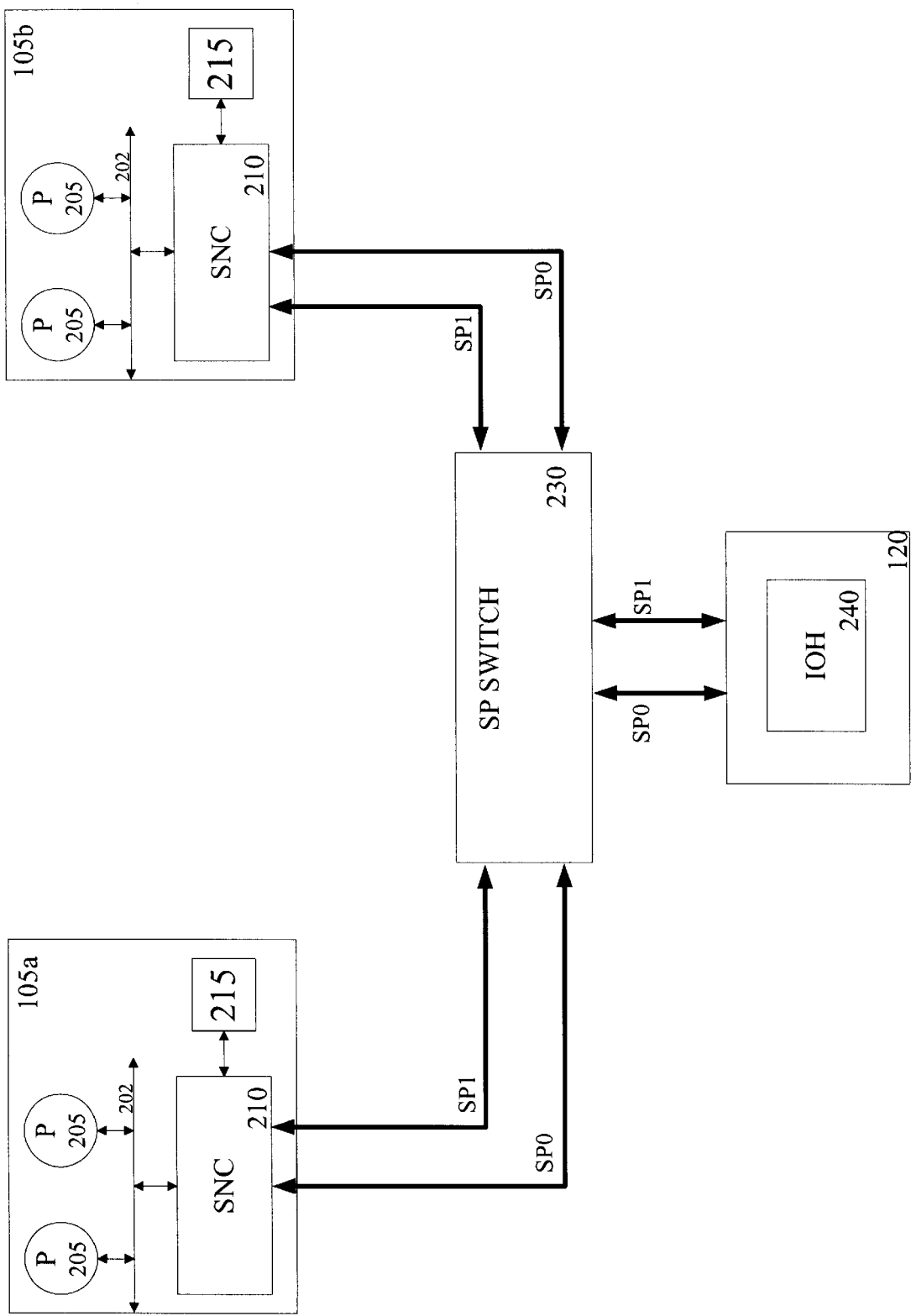
FIG. 2 is a block diagram of one embodiment of a computer system.

According to a further embodiment, 40 bits of protocol level information is communicated on physical transfers at the physical layer. The physical unit of data transfer is referred as a phit. The link layer between two point-to-point agents on a SP communicates on a higher granularity referred as flit or the independent unit of flow control. Each flit is 4 phits long. As described above, the protocol layer communicates using a packet-based protocol. Each packet consists of multiple flits FIG. 2 is a block diagram of one embodiment of computer system 100. In such an embodiment, computer system 100 includes processor nodes 105a and 105b coupled to I/O node 120 via a SP switch 230. According to one embodiment, each processor node 105 includes two central processing units (processors) 205 coupled to a processor bus 202. In one embodiment, processors 205 are processors in the Pentium® family of processors including the Pentium® II family and mobile Pentium® and Pentium® II processors available from Intel Corporation of Santa Clara, Calif. Alternatively, other processors may be used. According to a further embodiment, each processor 205 includes a second level (L2) cache memory (not shown in FIG. 2).

Each processor node 105 also includes a system node controller (SNC) 210 coupled to processor bus 202. SNC 210 is used to interface processor node 105 to SPs. In one embodiment, SNC 210 is implemented with the 870 chip set available from Intel Corporation; however, other chip sets can also be used. SNC 210 may include a memory controller (discussed below) for controlling a main memory 215 coupled to SNC 210.

Main memory 215 is coupled to processor bus 202 through SNC 210. Main memory 215 stores sequences of instructions that are executed by processor 105. In one embodiment, main memory 215 includes a dynamic random access memory (DRAM) system; however, main memory 215 may have other configurations. The sequences of instructions executed by processors 205 may be retrieved from main memory 215, or any other storage device. According to a further embodiment, each memory 215 within the various processor nodes 105 are uniformly addressable. As a result, a processor 205 within one processor node 105 may access the contents of a memory 215 within another processor node 105 in order to access a particular line of memory.

SP switch 230 is coupled to each processor node 105 via a SP0 and a SP1. In addition, SP switch 230 is coupled to I/O node 120 via a SP0 and a SP1. I/O node 120 includes an I/O hub (IOH) 240. According to one embodiment, there is a single protocol layer for SP0 and SP1. However, SP0 and SP1 have separate link and physical layers. IOH 240 provides an interface to I/O devices within computer system 100. For example, IOH 240 may be coupled to a network interface card (not shown).

SP switch 230 operates according to a central snoop coherence protocol. The central snoop coherence protocol is an invalidation protocol where any caching agent that intends to modify a cache line acquires an exclusive copy in its cache by invalidating copies at all the other caching agents. The coherence protocol assumes that the caching agents support some variant of a MESI coherence protocol, where the possible states for a cache line are Modified, Exclusive, Shared or Invalid.

The coherence protocol provides flexibility in snoop responses such that the protocol layer at the SP switch 230 can support different types of state transitions. For example, a cache line in the Modified state can transition either to a Shared state on a remote snoop or an Invalid state on a remote snoop, and the snoop response on the SP can indicate this for appropriate state transitions at SP switch 230 and the requesting agent. SP switch 230 includes a snoop filter (not shown). The snoop filter is organized as a tag cache that keeps information about the state of a cache line and a presence vector indicating the presence of the cache line at the caching nodes. In one embodiment, the presence vector has one bit per caching node in the system. If a caching agent at any node has a copy of the cache line, the corresponding bit in the presence vector for that cache line is set. A cache line could be either in Invalid, Shared, or Exclusive state in the snoop filter.

According to a further embodiment, the snoop filter is inclusive (e.g., without data, only the tag and state) of caches at all the caching agents. Thus, a caching agent does not have a copy of a cache line that is not present in the snoop filter. If a line is evicted from the snoop filter, it is evicted from the caching agents of all the nodes (marked in the presence vector). In other embodiments where multiple SP switches 230 may be included, the snoop filter is divided amongst the multiple SP switches 230 or into multiple caches within one switch 230 in order to provide sufficient snoop filter throughput and capacity to meet the system scalability requirement. In such embodiments, different snoop filters keep track of mutually exclusive set of cache lines. A cache line is tracked at all times by only one snoop filter.

The state of a cache line in the snoop filter is not always the same as the state in the caching agents. Because of the distributed nature of the system, the state transitions at the caching agents and at the snoop filter are not synchronized. Also, some of the state transitions at the caching agents are not externally visible and therefore the snoop filter may not be updated with such transitions. For example, transitions from Exclusive to Modified state and replacement of cache lines in Shared or Exclusive state may not be visible external to the caching agent.

In the Invalid state, the snoop filter is unambiguous. Thus, the cache line is not valid in any caching agent. All bits in the presence vector for the line in the snoop filter are reset. An unset bit in the presence vector in the snoop filter for a cache line is unambiguous. Consequently, the caching agent at the node indicated by the bit does not have a valid copy of the cache line. A cache line in Shared state at the snoop filter may be either in Shared or Invalid state at the caching agents at the node indicated by the presence vector in the Snoop Filter. A cache line in Exclusive state at the Snoop Filter may be in any (Modified, Exclusive, Shared or Invalid) state at the caching agents at the node indicated by the presence vector in the Snoop Filter.

If a cache line (e.g., a cache line in node 105a) is in a Shared state and a processor 205 at node 105a wants to execute a write transaction at that particular cache line, there are two approaches the processor 105 may take. One approach is to reread the particular data from memory 215 and place the cache line in the Exclusive state. Another approach, however, is for the processor 105 to transmit a port Invalidate request for the pertinent cache line at node 105b. A port Invalidate request is used by a requesting node to obtain exclusive ownership of a cache line at the requesting node. If the port Invalidate request is granted, the cache line is placed in an Exclusive state at the requesting node and the requesting node is granted full ownership of the cache line. In such an instance, there is no need for the requesting node to read the data from memory 215. Consequently, this approach is more efficient than the former.

A problem may occur, however, if both processor nodes 105 want to write data to one or more locations on the same cache line while in the Shared state. Such a scenario would result in multiple exclusive owners of the cache line, which is prohibited in computer system 100. However, if only one of the processors 205 is granted the exclusive ownership of the cache line and the other processor node 105 is invalidated, the processor node 105 cache line that was invalidated (e.g., issued an Invalidate request expecting it had a shared line) is not going to receive data. This may lead to incoherence in the system. Therefore, a mechanism is included within computer system 100 to detect concurrent invalidation requests.

Figure 3:
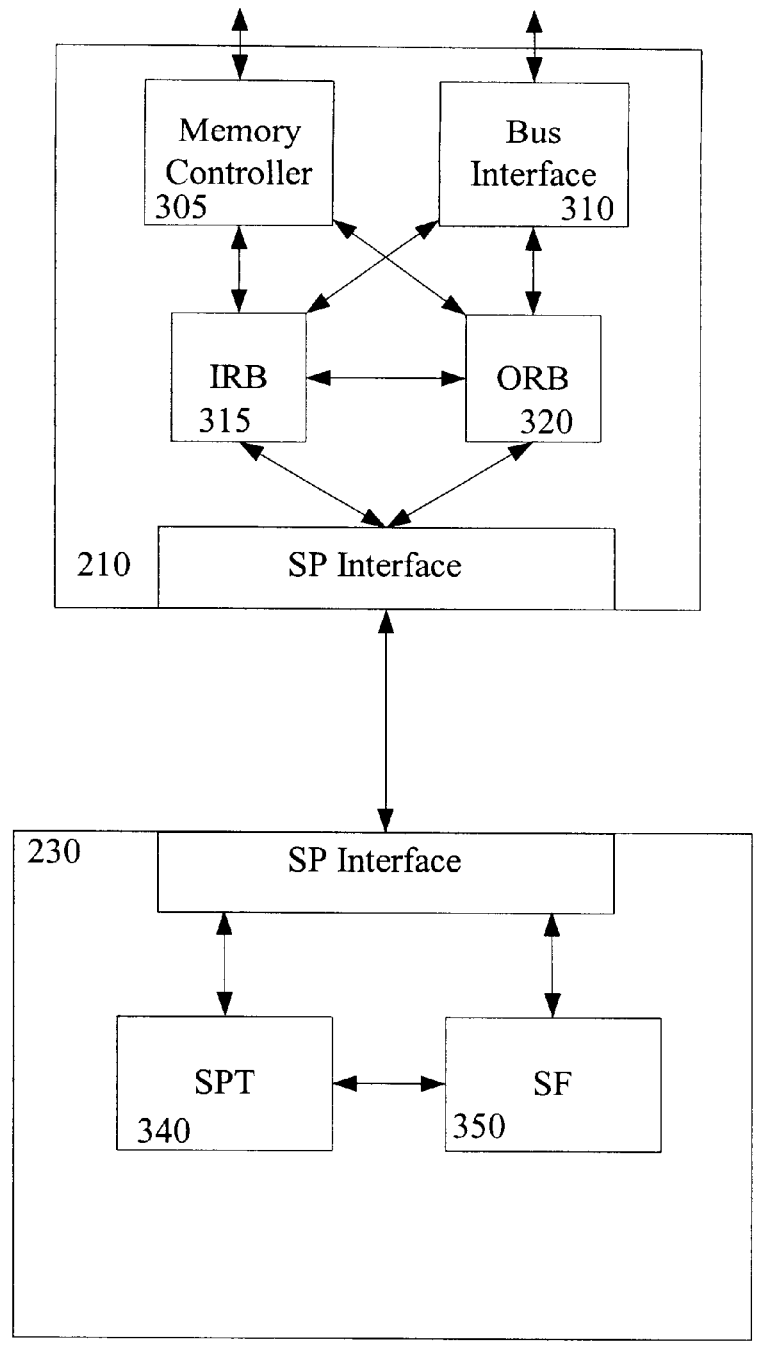
FIG. 3 is a block diagram of one embodiment of a conflict detection mechanism.

FIG. 3 is a block diagram of one embodiment of a conflict detection mechanism implemented in SNCs 210 within processor nodes 105 and SP switch 230. According to one embodiment, each SNC 210 includes a memory controller 305, a bus interface 310, an incoming request buffer (IRB) 315, an outgoing request buffer (ORB) 320 and an SP interface. Memory controller 305 accesses memory 215 for memory transactions based upon commands received from processors 105 within the same node, other node As 110 one or more peripheral devices coupled to IOH 240. Memory controller 305 may read data from, and write data to, memory 215.

Bus interface 310 provides the interface between SNC 210 and processor bus 202. IRB 315 is used to store SP requests initiated due to requests at remote nodes. These requests could be a memory access at the node, a snoop access to the caching agents at the node, or a combination of both. According to one embodiment, each IRB 315 entry includes the address, request type, snoop result, other state information and data. In a further embodiment, the conflict detection and resolution due to concurrent accesses to the same cache line at a node requires that some IRB 315 entries are blocked for some event at a conflicting ORB 320 entry. Thus, in one embodiment the number of entries in IRB 315 is larger than the number of entries in ORB 320 to prevent deadlocks.

ORB 320 includes a buffer that keeps track of outstanding coherent requests on the SP. In particular, the ORB 320 buffer keeps track of the address, transaction identifier, local snoop result, snoop and data response, completion response and a pointer to a pending snoop for that address due to a request generated at a remote node. According to one embodiment, ORB 320 has one outstanding transaction at any time for a particular cache line.

SP switch 230 includes a snoop pending table (SPT) 340 and snoop filter (SF) 350. As discussed earlier, SF 350 tracks the state of cache lines in the caching nodes. In particular SF 350 is inclusive of tags in the processor caches and is used to filter snoops from showing up at remote nodes that do not contain a copy of a particular data block. SPT 340 tracks transactions received at SP switch 230 from all ports until snooping has completed. In particular, SPT 340 detects multiple concurrent requests from different ports to the same cache line. In one embodiment, each SPT 340 entry includes the address, the cache line state at SF 350 and the presence vector of the cache line.

Figure 4:
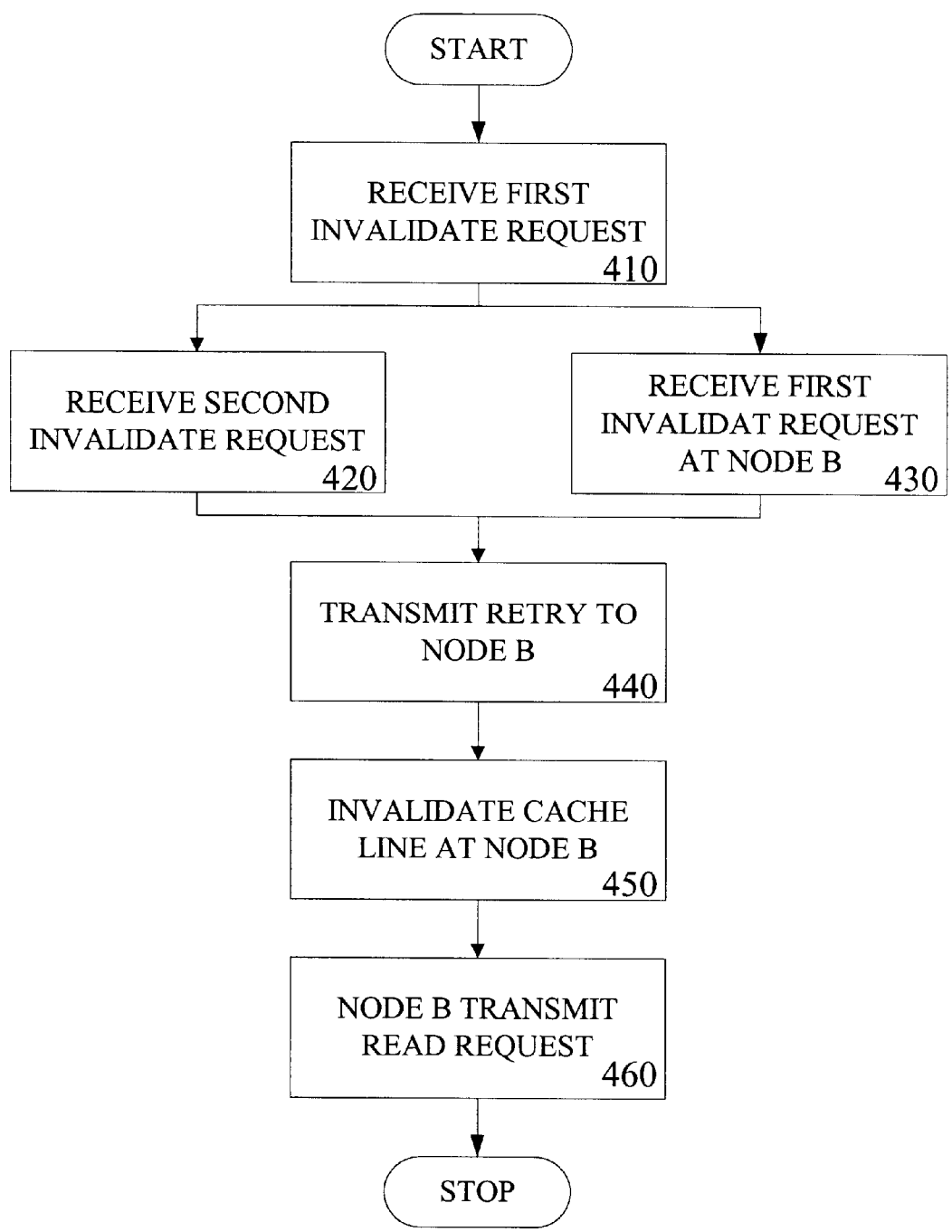
FIG. 4 is a flow diagram for one embodiment of detecting conflicting Invalidation requests.

With the implementation of the conflict detection mechanism, SP switch 230 and SNCs 210, concurrent invalidation requests can be detected and resolved based on the order in which SP switch 230 processes these requests. FIG. 4 is a flow diagram for one embodiment of detecting conflicting Invalidation requests. At process block 410, a port Invalidate request is received at SP switch 230 from a processor node 105 (e.g., node 105*a*). At process block 420, a second port Invalidate request is received at SP switch 230 from another processor node 105 (e.g., node 105*b*). At this time, SPT 340 detects the conflicting requests to gain exclusive control of a cache line.

While the second port Invalidate request is being received at SP switch 230, the first port Invalidate request is being received at the IRB 315 of node 105*b*, process block 430. Since the outgoing port Invalidate request from node 105*b* is in ORB 320, the request received at the IRB 315 is blocked until acknowledgement of the outgoing request is received. At process block 440, SP switch 230 transmits a retry signal to node 105*b*. Upon receiving the retry request node 105*b* recognizes the conflict between IRB 315 and ORB 320, and the request received at IRB 315 is unblocked. Consequently, the cache line at node 105*b* is put in an Invalidated state at process block 450. Note that if no conflict is detected at node 105*b*, node 105*b* retransmits the port Invalidate request. At process block 460, node 105*b* transmits a port read request to SP switch 230 in order to read the data that was in the invalidated cache line from memory 215.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

---

APPENDIX A

William E. Alford, Reg. No. 37,764; Farzad E. Amini, Reg. No. P42,261; Aloysius T. C. AuYeung, Reg. No. 35,432; William Thomas Babbitt, Reg. No. 39,591; Carol F. Barry, Reg. No. 41,600; Jordan Michael Becker, Reg. No. 39,602; Lisa N. Benado, Reg. No. 39,995; Bradley J. Bereznak, Reg. No. 33,474; Michael A. Bernadicou, Reg. No. 35,934; Roger W. Blakely, Jr., Reg. No. 25,831; R. Alan Burnett, Reg. No. 46,149; Gregory D. Caldwell, Reg. No. 39,926; Andrew C. Chen, Reg. No. 43,544; Paul W. Churilla, Reg. No. P-47,495; Thomas M. Coester, Reg. No. 39,637; Donna Jo Coningsby, Reg. No. 41,684; Florin Corie, Reg. No. 46,244; Dennis M. deGuzman, Reg. No. 41,702; Stephen M. De Klerk, Reg. No. P46,503; Michael Anthony DeSanctis, Reg. No. 39,957; Daniel M. De Vos, Reg. No. 37,813; Robert Andrew Diehl, Reg. No. 40,992; Sanjeet Dutta, Reg. No. P46,145; Matthew C. Fagan, Reg. No. 37,542; Tarek N. Fahmi, Reg. No. 41,402; George Fountain, Reg. No. 37,374; Paramita Ghosh, Reg. No. 42,806; James Y. Go, Reg. No. 40,621; Libby N. Ho, Reg. No. P46,774; James A. Henry, Reg. No. 41,064; Willmore F. Holbrow II, Reg. No. P41,845; Sheryl Sue Holloway, Reg. No. 37,850; George W Hoover II, Reg. No. 32,992; Eric S. Hyman, Reg. No. 30,139; William W. Kidd, Reg. No. 31,772; Sang Hui Kim, Reg. No. 40,450; Walter T. Kim, Reg. No. 42,731; Eric T. King, Reg. No. 44,188; Erica W. Kuo, Reg. No. 42,775; George Brian Leavell, Reg. No. 45,436; Kurt P. Leyendecker, Reg. No. 42,799; Gordon R. Lindeen III, Reg. No. 33,192; Jan Carol Little, Reg. No. 41,181; Joseph Lutz, Reg. No. 43,765; Michael J. Mallie, Reg. No. 36,591; Andre L. Marais, under 37 C.F.R. § 10.9(b); Paul A. Mendonsa, Reg. No. 42,879; Clive D. Menezes, Reg. No. 45,493; Michael J. Nesheiwat, Reg. No. P-47,819; Chun M. Ng, Reg. No. 36,878; Thien T. Nguyen, Reg. No. 43,835; Thinh V. Nguyen, Reg. No. 42,034; Dennis A. Nicholls, Reg. No. 42,036; Daniel E. Ovanezian, Reg. No. 41,236; Kenneth B. Paley, Reg. No. 38,989; Marina Portnova,

APPENDIX A-continued

Reg. No. P45,750; William F. Ryann, Reg. 44,313; James H. Salter, Reg. No. 35,668; William W. Schaal, Reg. No. 39,018; James C. Scheller, Reg. No. 31,195; Jeffrey Sam Smith, Reg. No. 39,377; Maria McCormack Sobrino, Reg. No. 31,639; Stanley W. Sokoloff, Reg. No. 25,128; Judith A. Szepesi, Reg. No. 39,393; Vincent P. Tassinari, Reg. No. 42,179; Edwin H. Taylor, Reg. No. 25,129; John F. Travis, Reg. No. 43,203; Joseph A. Twarowski, Reg. No. 42,191; Tom Van Zandt, Reg. No. 43,219; Brent E. Vecchia, Reg. No. P-48,011; Lester J. Vincent, Reg. No. 31,460; Glenn E. Von Tersch, Reg. No. 41,364; John Patrick Ward, Reg. No. 40,216; Mark L. Watson, Reg. No. P46,322; Thomas C. Webster, Reg. No. P46,154; Steven D. Yates, Reg. No. 42,242; and Norman Zafman, Reg. No. 26,250; my patent attorneys, and Firasat Ali, Reg. No. 45,715; and Justin M. Dillon, Reg. No. 42,486; my patent agents, of BLAKELY, SOKOLOFF, TAYLOR & ZAFMAN LLP, with offices located at 12400 Wilshire Boulevard, 7th Floor, Los Angeles, California 90025, telephone (310) 207-3800, and Alan K. Aldous, Reg. No. 31,905; Edward R. Brake, Reg. No. 37,784; Ben Burge, Reg. No. 42,372; Jeffrey S. Draeger, Reg. No. 41,000; Cynthia Thomas Faatz, Reg No. 39,973; John N. Greaves, Reg. No. 40,362; Seth Z. Kalson, Reg. No. 40,670; David J. Kaplan, Reg. No. 41,105; Peter Lam, Reg. No. 44,855; Charles A. Mirho, Reg. No. 41,199; Leo V. Novakoski, Reg. No. 37,198; Thomas C. Reynolds, Reg. No. 32,488; Kenneth M. Seddon, Reg. No. 43,105; Mark Seeley, Reg. No. 32,299; Steven P. Skabrat, Reg. No. 36,279; Howard A. Skaist, Reg. No. 36,008; Gene I. Su, Reg. No. 45,140; Calvin E. Wells, Reg. No. P43,256, Raymond J. Werner, Reg. No. 34,752; Robert G. Winkle, Reg. No. 37,474; and Charles K. Young, Reg. No. 39,435; my patent attorneys, of INTEL CORPORATION; and James R. Thein, Reg. No. 31,710, my patent attorney with full power of substitution and revocation, to prosecute this application and to transact all business in the Patent and Trademark Office connected herewith.

APPENDIX B

Title 37, Code of Federal Regulations, Section 1.56
Duty to Disclose Information Material to Patentability (a) A patent by its very nature is affected with a public interest. The public interest is best served, and the most effective patent examination occurs when, at the time an application is being examined, the Office is aware of and evaluates the teachings of all information material to patentability. Each individual associated with the filing and prosecution of a patent application has a duty of candor and good faith in dealing with the Office, which includes a duty to disclose to the Office all information known to that individual to be material to patentability as defined in this section. The duty to disclosure information exists with respect to each pending claim until the claim is cancelled or withdrawn from consideration, or the application becomes abandoned. Information material to the patentability of a claim that is cancelled or withdrawn from consideration need not be submitted if the information is not material to the patentability of any claim remaining under consideration in the application. There is no duty to submit information which is not material to the patentability of any existing claim. The duty to disclosure all information known to be material to patentability is deemed to be satisfied if all information known to be material to patentability of any claim issued in a patent was cited by the Office or submitted to the Office in the manner prescribed by §§ 1.97(b)–(d) and 1.98. However, no patent will be granted on an application in connection with which fraud on the Office was practiced or attempted or the duty of disclosure was violated through bad faith or intentional misconduct. The Office encourages applicants to carefully examine:
    (1) Prior art cited in search reports of a foreign patent office in a counterpart application, and
    (2) The closest information over which individuals associated with the filing or prosecution of a patent application believe any pending claim patentably defines, to make sure that any material information contained therein is disclosed to the Office.
    (b) Under this section, information is material to patentability when it is not cumulative to information already of record or being made or record in the application, and
    (1) It establishes, by itself or in combination with other information, a prima facie case of unpatentability of a claim; or
    (2) It refutes, or is inconsistent with, a position the applicant takes in:
    (i) Opposing an argument of unpatentability relied on by the Office, or
    (ii) Asserting an argument of patentability.
A prima facie case of unpatentability is established when the information compels a conclusion that a claim is unpatentable under the preponderance of evidence, burden-of-proof standard, giving each term in the claim its broadest reasonable construction consistent with the specification, and before any consideration is given to evidence which may be submitted in an attempt to establish a contrary conclusion of patentability.
    (c) Individuals associated with the filing or prosecution of a patent application within the meaning of this section are:
    (1) Each inventor named in the application;
    (2) Each attorney or agent who prepares or prosecutes the application; and
    (3) Every other person who is substantively involved in the preparation or prosecution of the application and who is associated with the inventor, with the assignee or with anyone to whom there is an obligation to assign the application.
    (d) Individuals other than the attorney, agent or inventor may comply with this section by disclosing information to the attorney, agent, or inventor.

What is claimed is:

1. A method comprising:
receiving a first request from a first processor node in a multi-node computer system via a point-to-point cache coherent interface to invalidate a first cache line at a second processor node, the interface comprising two or more layers having a separate set of protocol functions; receiving a second request from the second processor node via the interface to invalidate the first cache line at the first processor node; and
detecting the concurrent requests at conflict detection circuitry.

2. The method of claim 1 further comprising transmitting the first request to the second processor node.

3. The method of claim 2 further comprising blocking the first request at the second processor node after detecting the concurrent requests at the second node.

4. The method of claim 3 further comprising:
transmitting a retry acknowledgement to the second processor node after receiving the second request from the second processor node; and
unblocking the first request at the second processor node; and
invalidating the first cache line at the second processor node.

5. The method of claim 4 further comprising:
transmitting a read request to a memory device:
transmitting a read request to a memory device; and
receiving data corresponding to the read request at the second processor node, wherein the data corresponds to the data in the first cache line at the second processor node.

6. A computer system comprising:
a first processor node;
a point-to-point cache coherent interface, coupled to the first processor node, comprising two or more layers, each layer having a separate set of protocol functions;
a scalability port (SP) switch coupled to the interface; and
a second processor node coupled to the SP switch via the interface, wherein the first processor node, the second processor node and the SP switch comprise a conflict detection mechanism that detects concurrent requests from the first and second processor nodes to access the same cache line.

7. The computer system of claim 6 wherein the conflict detection mechanism detects conflicts between a request from the first processor node to invalidate the cache line within the second processor node and a request from the second processor node to invalidate the cache line within the first processor node.

8. The computer system of claim 6 wherein the first and second processor nodes each comprise:
a first central processing unit (CPU);
a second CPU;
a system node controller coupled to the first and second CPUs; and
a memory device coupled to the system node controller.

9. The computer system of claim 8 wherein each system node controller comprises:
a SP interface;
an incoming request buffer (IRB) coupled to the SP interface; and
an outgoing request buffer (ORB) coupled to the IRB and the SP interface.

10. The computer system of claim 9 wherein each system node controller further comprises:
a memory controller coupled to the IRB and the ORB; and
a bus interface coupled to the IRB and the ORB.

11. The computer system of claim 6 wherein the SP switch comprises:
a SP interface;
a snoop pending table (SPT) coupled to the SP interface; and
a snoop filter coupled to the SPT and the SP interface.

12. The computer system of claim 11 wherein the SPT detects requests by the first processor node and the second processor node to invalidate the same cache line of the first processor node and the second processor node.

13. The computer system of claim 6 further comprising an input/output (I/O) node coupled to the SP switch.

14. A scalability port (SP) switch comprising:
a SP interface including two or more layers, each layer having a separate set of protocol functions;
a snoop pending table (SPT) coupled to the SP interface; and
a snoop filter coupled to the SPT and the SP interface;
wherein the SPT detects concurrent requests from a first processor node and a second processor node via a point-to-point cache coherent interface to access the same cache line.

15. The SP switch of claim 14 wherein the requests by the first processor node and the second processor node are requests to invalidate the same cache line of the first processor node and the second processor node.

* * * * *

UNITED STATES PATENT AND TRADEMARK OFFICE
CERTIFICATE OF CORRECTION

| | | |
|---|---|---|
| PATENT NO. | : 6,622,215 B2 | Page 1 of 1 |
| APPLICATION NO. | : 09/753263 | |
| DATED | : September 16, 2003 | |
| INVENTOR(S) | : Khare et al. | |

It is certified that error appears in the above-identified patent and that said Letters Patent is hereby corrected as shown below:

In columns 5,6,7, and 8, delete both APPENDIX A and APPENDIX B.

Signed and Sealed this

Twelfth Day of September, 2006

JON W. DUDAS
*Director of the United States Patent and Trademark Office*